(12) United States Patent
Noheji (10) Patent No.: US 7,805,085 B2
(45) Date of Patent: Sep. 28, 2010

(54) OPTICAL RECEPTION APPARATUS

(75) Inventor: Kiyotoshi Noheji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 617 days.

(21) Appl. No.: 11/819,737

(22) Filed: Jun. 28, 2007

(65) Prior Publication Data
US 2008/0013964 A1    Jan. 17, 2008

(30) Foreign Application Priority Data
Jun. 30, 2006    (JP)    ............... 2006-180837

(51) Int. Cl.
*H04B 10/06*    (2006.01)
*H04B 10/00*    (2006.01)
(52) U.S. Cl. ............... 398/209; 398/155; 398/188; 398/202
(58) Field of Classification Search ............... 398/149, 398/154, 155, 202, 206, 207, 208, 209, 212, 398/213, 214, 188
See application file for complete search history.

(56) References Cited

U.S. PATENT DOCUMENTS

| 5,438,592 | A | 8/1995 | Boccuzzi | |
|---|---|---|---|---|
| 2006/0067703 | A1 | 3/2006 | Haunstein et al. | |
| 2007/0065157 | A1* | 3/2007 | Katagiri et al. | ............ 398/155 |

FOREIGN PATENT DOCUMENTS

| JP | 8-84165 | 3/1996 |
|---|---|---|
| JP | 2004-516743 | 6/2004 |
| WO | 02/51041 | 6/2002 |
| WO | 2005/107107 | 11/2005 |

OTHER PUBLICATIONS

Extended European Search Report issued in corresponding European Patent Application No. 07012595.0, on Dec. 20, 2007.

* cited by examiner

*Primary Examiner*—M. R. Sedighian
(74) *Attorney, Agent, or Firm*—Staas & Halsey LLP (57) ABSTRACT

An optical reception apparatus according to the present invention comprises: a branching section that branches an optical signal input thereto into two; first and second delay interferometers arranged on optical paths through which the branched lights are propagated; first and second photoelectric converting sections that receive the output lights from the delay interferometers; a clock recovery circuit for recovering a clock signal based on a data signal output from one of the photoelectric converting sections; a multiplexing section that multiplexes data signals from the photoelectric converting sections in accordance with the clock signal; and a delay interferometer control section that resets operating conditions of the delay interferometers when the frame synchronization is not achieved. Thus, it becomes possible to perform the demodulation processing on the signal light which is differential phase shift keying modulated using a quadrature phase component, utilizing a general-purpose framer.

10 Claims, 7 Drawing Sheets

FIG.1

FIRST EMBODIMENT OF PRESENT INVENTION

OPTICAL RECEPTION APPARATUS

FIG.2

EMBODIMENT 1-1

FIG.3

EMBODIMENT 1-2

FIG.4

EMBODIMENT 1-3

FIG.5

SECOND EMBODIMENT OF PRESENT INVENTION

OPTICAL RECEPTION APPARATUS

FIG.6

EMBODIMENT 2-1

FIG.7

EMBODIMENT 2-2

FIG.8

EMBODIMENT 2-3

FIG.9

RELATED ART

CONFIGURATION EXAMPLE OF (CS)RZ-DQPSK MODULATION FORMAT

FIG.10

RELATED ART (CS)RZ-DQPSK MODULATION FORMAT

FIG.11

OPTICAL RECEPTION APPARATUS

BACKGROUND OF THE INVENTION

1. Field of the Invention

The present invention relates to an optical reception apparatus for receiving a phase modulated signal light, and in particular, to a technology for demodulating a signal light which is differential phase-shift keying modulated using a quadrature-phase component.

2. Description of the Related Art

In recent years, there have been increased demands for introducing a 40 Gbit/s optical transmission system of next generation, and furthermore, such a system is required to achieve a transmission distance and frequency utilization efficiency equivalent to those of a 10 Gbit/s system. As means for realizing such a system, there has been actively performed the search and development of the RZ (Return to Zero)-DPSK (Differential Phase Shift Keying) modulation or the CSRZ (Carrier Suppressed Return to Zero)-DPSK modulation, which is a modulation format with excellent optical signal-to-noise ratio (OSNR) efficiency and excellent non-linear tolerance, in comparison with a NRZ (Non Return to Zero) modulation format which has been applied to a conventional system of 10 Gbit/s or lower. Moreover, in addition to the above modulation format, there has also been actively performed the search and development of a phase modulation format such as the RZ-DQPSK (Differential Quadrature Phase-Shift Keying) modulation or a CSRZ-DQPSK modulation, which has a feature of narrow spectrum (high frequency utilization efficiency) (refer to Japan National Phase Patent Publication No. 2004-516743 and Japanese Unexamined Patent Publication No. 8-84165).

Figure 9:
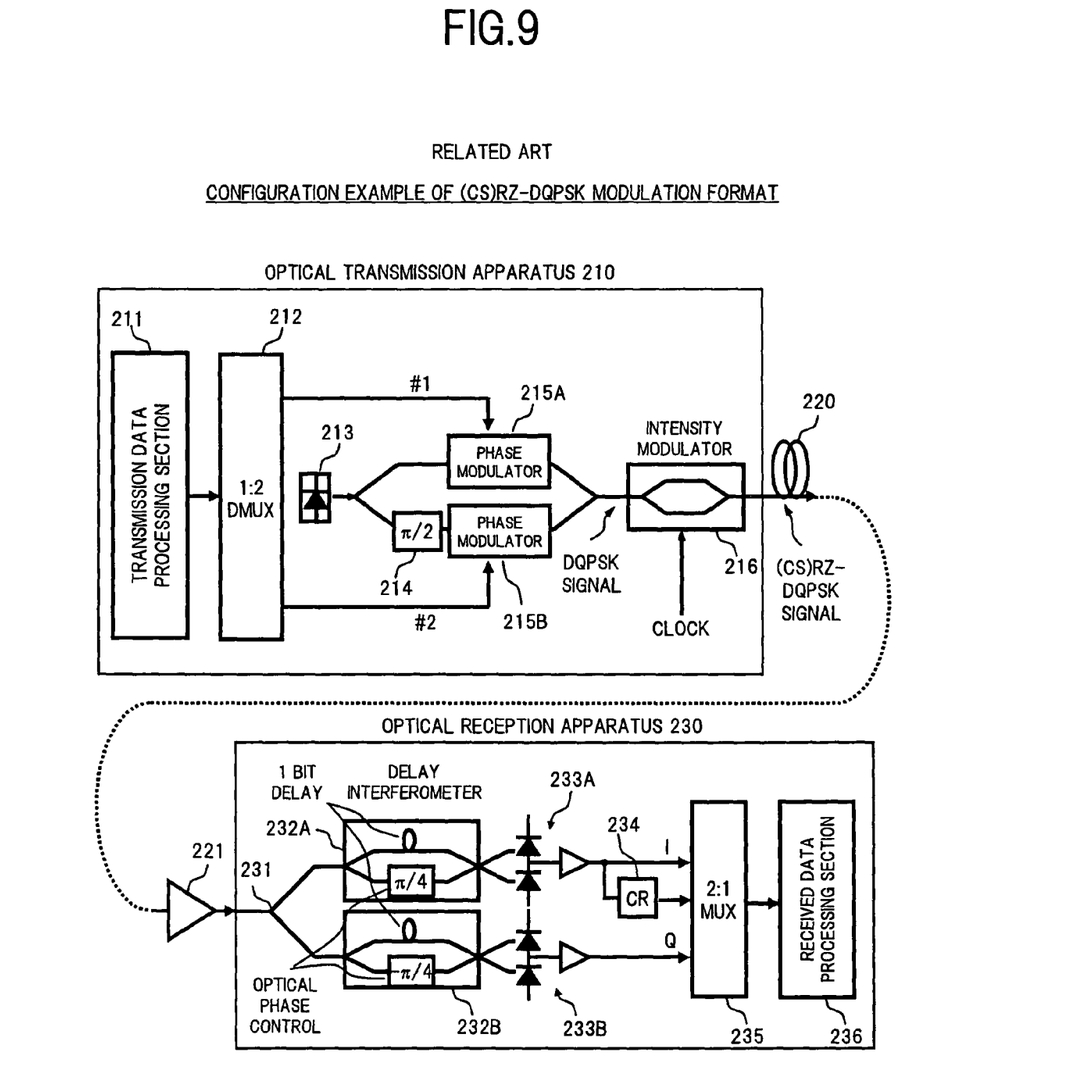
FIG. 9 is a diagram showing a configuration example of a conventional optical transmission apparatus and a conventional optical reception apparatus to which a (CS)RZ-DQPSK modulation format is adopted.
Figure 10:
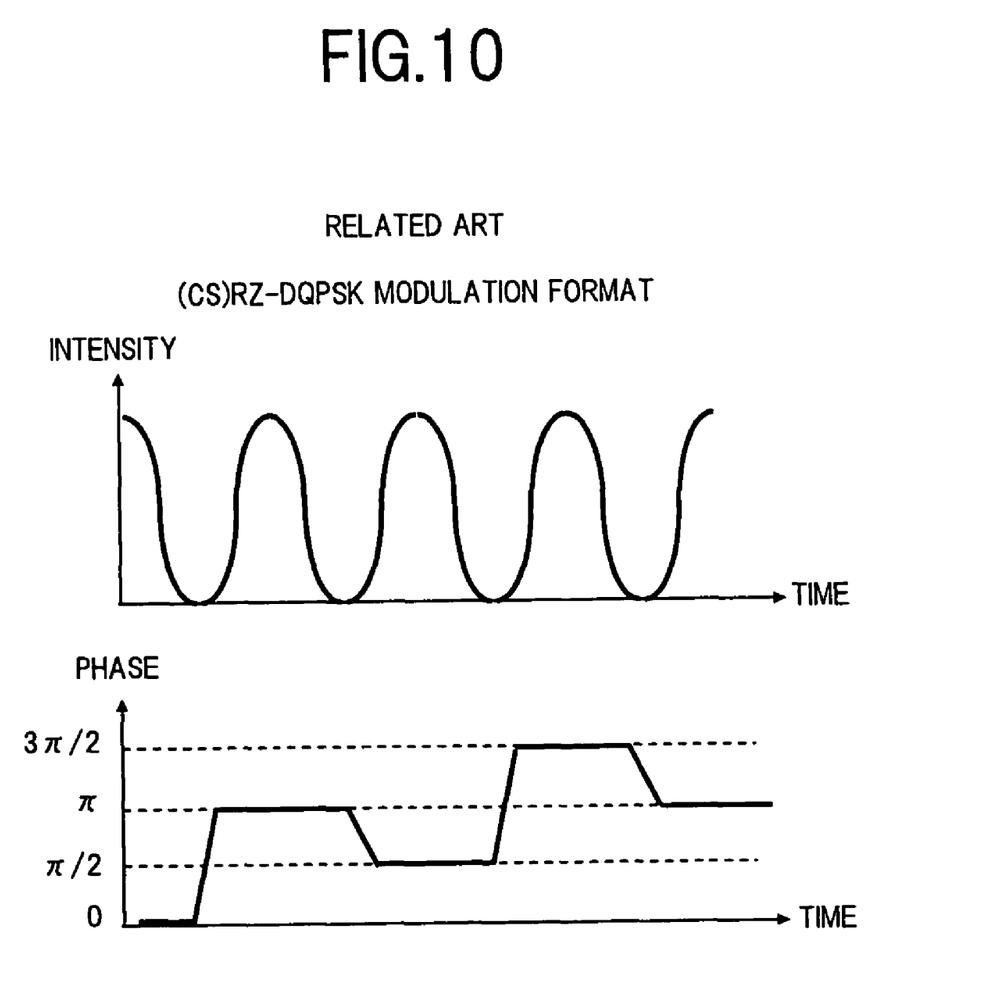
FIG. 10 is a graph showing states of optical intensity and optical phase in the case where a (CS)RZ-DQPSK modulated optical signal is transmitted/received.

FIG. 9 is a diagram showing a configuration example of an optical transmission apparatus and an optical reception apparatus to which a RZ-DQPSK or a CSRZ-DQPSK modulation format (to be referred to as (CS)RZ-DQPSK modulation format, hereunder) is adopted. Further, FIG. 10 is a graph showing states of optical intensity and optical phase in the case where a (CS)RZ-DQPSK modulated optical signal is transmitted/received.

In FIG. 9, an optical transmission apparatus 210 comprises, for example, a transmission data processing section 211, a 1:2 demultiplexing section (DEMUX) 212, a CW light source 213, a π/2 phase shifter 214, two phase modulators 215A and 215B, and a RZ pulsing intensity modulator 216.

To be specific, the transmission data processing section 211 is provided with a function as a framer for framing input data and a function as a FEC (Forward Error Correction) encoder for giving an error-correcting code, and also, is provided with a function as a DQPSK pre-coder for performing the coding processing reflected with information of a difference between a code of 1 bit before and a current code.

The 1:2 demultiplexing section 212 demultiplexes the coded data from the transmission data processing section 211 into coded data #1 and coded data #2 in dual series of ½ times a bit rate.

The CW light source 213 is for outputting a continuous light, and the output continuous light is separated into two, so that one of the separated lights is input to the phase modulator 215A, and the other is input to the phase modulator 215B via the π/2 phase shifter 214.

The phase modulator 215A modulates the continuous light from the CW light source 213 using the coded data #1 which is one of the dual series demultiplexed by the 1:2 demultiplexing section 212, to output an optical signal in which a binary optical phase (0rad or πrad) thereof carries information. Further, the phase modulator 215B is input with a light which is obtained by phase shifting the continuous light from the CW light source 213 by π/2 in the π/2 phase shifter 214, and modulates this input light using the coded data #2, which is the other of the dual series demultiplexed by the 1:2 demultiplexing section 212, to output an optical signal in which a binary optical phase (π/2rad or 3 π/2rad) thereof carries information. The lights modulated by the phase modulators 215A and 215B are multiplexed with each other, to be output to the latter staged RZ pulsing intensity modulator 216. Namely, the modulated lights from the phase modulators 215A and 215B are multiplexed with each other, so that an optical signal in which optical intensity thereof is fixed but a four-valued optical phase thereof carries information (refer to the lower stage of FIG. 10), that is, a DQPSK modulated optical signal, is sent to the RZ pulsing intensity modulator 216.

The RZ pulsing intensity modulator 216 is for RZ pulsing the DQPSK modulated signal from the phase modulators 215A and 215B. In particular, an optical signal which is RZ pulsed using a clock drive signal having a frequency same as a bit rate of data #1 and data #2, and also having the amplitude of 1 time an extinction voltage (Vπ), is called a RZ-DQPSK signal, and further, an optical signal which is RZ pulsed using a clock drive signal having a frequency half the bit rate of data #1 and data #2, and also having the amplitude of 2 times the extinction voltage (Vπ), is called a CSRZ-DQPSK signal.

Further, an optical reception apparatus 230 is connected to the optical transmission apparatus 210 via a transmission path 220 and an optical repeater 221, to perform the reception processing on the (CS)RZ-DQPSK signal from the optical transmission apparatus 210, which has been repeatedly transmitted, and comprises, for example, a branching section 231 that branches the received optical signal into two, and also comprises, on optical signal paths thereof through which the branched optical signals are respectively propagated, delay interferometers 232A and 232B, and photoelectric converting sections 233A and 233B. Further, the optical reception apparatus 230 comprises a clock recovery (CR) circuit 234 for recovering a clock signal based on a data signal from the photoelectric converting section 233A, a 2:1 multiplexing section (MUX) 235 that multiplexes data signals from the photoelectric converting sections 233A and 233B, and a received data processing section 236.

To be specific, the delay interferometers 232A and 232B receive respectively the optical signals which are obtained by branching the (CS)RZ-DQPSK signal transmitted through the transmission path 220 and the optical repeater 221 into two by the branching section 231. The delay interferometer 232A makes a delay component per 1 bit time and a component phase controlled of π/4rad to interfere (delay interfere) with each other, to output interference results thereof as two outputs. Further, the delay interferometer 232B makes a delay component per 1 bit time and a component phase controlled of −π/4rad (which is shifted by π/2rad to the phase controlled component in the delay interferometer 232A) to interfere (delay interfere) with each other, to output interference results thereof as two outputs. Here, the delay interferometers 232A and 232B each is configured by a Mach-Zehnder interferometer, and each Mach-Zehnder interferometer is configured so that one of branched waveguides is formed to be longer than the other branched waveguide by the propagation length equivalent to the 1 bit time, and also, is formed with an electrode for phase controlling the optical signal propagated through the other branched waveguide.

The photoelectric converting sections 232A and 232B are respectively configured by dual pin photodiodes for receiving the respective outputs from the delay interferometers 232A and 232B to perform differential photoelectric conversion detections. Incidentally, the received signals detected respectively by the photoelectric converting sections 233A and 233B are appropriately amplified by amplifiers.

The clock recovery circuit 234 recovers the clock signal from the received signal which is subjected to the differential photoelectric conversion detection in the photoelectric converting section 232A, to output it to the 2:1 multiplexing section 235.

The 2:1 multiplexing section 235 multiplexes data (for example, an in-phase component I) output from the photoelectric converting section 233A and data (for example, a quadrature-phase component Q) output from the photoelectric converting section 233B in accordance with timing of the clock signal from the clock recovery circuit 234, to convert the multiplexed data into the data signal before DQPSK modulation.

The received data processing section 236 is provided with a function as a framer for framing the data signal output from the 2:1 multiplexing section 235, a function as a decoder for decoding the given error-correcting code, and the like.

Generally, in the case of performing the transmission of a differential phase shift keying modulated signal light, for the decoding processing of a transmission light, a synchronization detection using a framer is required for achieving the synchronization with an original signal (transmitted signal). For example, in the optical reception apparatus 230 corresponding to the (CS)RZ-DQPSK modulation format shown in FIG. 9, the synchronization detection by the framer function of the received data processing section 236 is performed on the data signal which is obtained by multiplexing the output signals from the respective photoelectric converting sections 233A and 233B, in the 2:1 multiplexing section 235.

However, in the configuration of the optical reception apparatus 230 as described in the above, a phase relation between the data signals output from the photoelectric converting sections 233A and 233B is merely in a relatively quadrature-phase state, and which of the data signals corresponds to the in-phase component I or the quadrature-phase component Q depends on operating conditions of the respective delay interferometers 232A and 232B. Therefore, for example in the case where the designing of the latter staged synchronization detection processing is made provided that the component I at the transmission time corresponds to the data signal from the photoelectric converting section 233A and the component Q at the transmission time corresponds to the data signal from the photoelectric converting section 233B, there is a problem in that the inversion or the shifting occurs between the component I and the component Q. Further, in the 2:1 multiplexing section 235, since the respective data signals are multiplexed with each other in accordance with the timing of the clock signal recovered in the clock recovery circuit 234, there is a problem in that the shifting occurs also in time strings of the components I and Q depending on the phase relation between the data signals and the clock signal.

To be specific, explaining a factor of the inversion between the component I and the component Q, in each of the delay interferometers 232A and 232B, as described above, the two quadrature-phase components of the input light are separated, and thereafter, a phase change of the transmitted signal is detected based on a difference between the optical phases obtained by making the delay component per 1 bit time and the component phase controlled of $\pm\pi/4$ rad to interfere (delay interfere) with each other, so that the detection results are output as the signal components. Therefore, logic of the component I or the component Q may be inverted depending on changes in wavelengths or phases of the lights input to the delay interferometers 232A and 232B, or on state changes in the delay interferometers 232A and 232B for when the two quadrature-phase components are separated. Specifically, the conditions of the delay interferometers 232A and 232B can be optimized by feedback controlling delay amounts or the like thereof using the output signals from the photoelectric converting sections 233A and 233B respectively corresponding to the delay interferometers 232A and 232B. However, even if the feedback control in the delay interferometer 232A is same as that in the delay interferometer 232B, the difference between the optical phases detected in the delay interferometers 232A and 232B cannot be exactly the same. Thus, the inversion between the component I and the component Q occurs depending on the operating conditions of the delay interferometers 232A and 232B.

Further, explaining a factor of the shifting between the components I and Q, even if the similar feedback controls are performed to optimize the conditions of the delay interferometers 232A and 232B for when the two quadrature-phase components are separated, the phase states exactly the same as those on the transmission side cannot be achieved, and for example even if the designing is made provided that the component I is output to the delay interferometer 232A, there occurs a state where the component Q is output thereto. Incidentally, in this state, the component I is output to the delay interferometer 232B. Furthermore, in the clock recovery circuit 234, the clock signal is extracted based on a frequency component of one of the input signals to the 2:1 multiplexing section 235 (in the configuration example of FIG. 9, the signal sent from the photoelectric converting section 233A to the 2:1 multiplexing section 235), and therefore, a relative phase relation between the clock signal output from the clock recovery circuit 234 and the two input signals to the 2:1 multiplexing section 235 is not clearly defined. As a result of this, there occurs a phenomenon in which the component I and the component Q are shifted to each other due to the phase relation between the data signals and the clock signal, which are input to the 2:1 multiplexing section 235.

Moreover, in addition to the shifting between the components I and Q, also one bit delay may occur. Explaining a factor of the one bit delay in this case, sometimes, a circuit is mounted for separating the input signal to the received data processing section into 1:16 or the like, for example in order to decrease a speed of an electric signal to be processed in the received data processing section 236 on the latter stage of the 2:1 multiplexing section 235. In such a configuration, if the shifting between the components I and Q occurs in the output signal of the 2:1 multiplexing section 235, the further one bit delay occurs with probability ½.

Collecting up occurrence states of the inversion and the shifting between the components I and Q, the next table 1 is obtained. Incidentally, herein, the state where the component I is output from the delay interferometer 233A side and the component Q is output from the delay interferometer 233B side is assumed to be a correct reception state.

TABLE 1

| | | delay interferometer 233A side output | | | |
|---|---|---|---|---|---|
| | | Q | $\overline{Q}$ | $\overline{I}$ | I |
| delay interferometer | Q | X | X | ○ | ◉ |
| | $\overline{Q}$ | X | X | ○ | ○ |

TABLE 1-continued

|  |  | delay interferometer 233A side output | | | |
| --- | --- | --- | --- | --- | --- |
|  |  | Q | $\bar{Q}$ | $\bar{I}$ | I |
| 233B side output | $\bar{I}$ | ∆ | ∆ | X | X |
|  | I | ◇ | ∆ | X | X |

Figure 11:
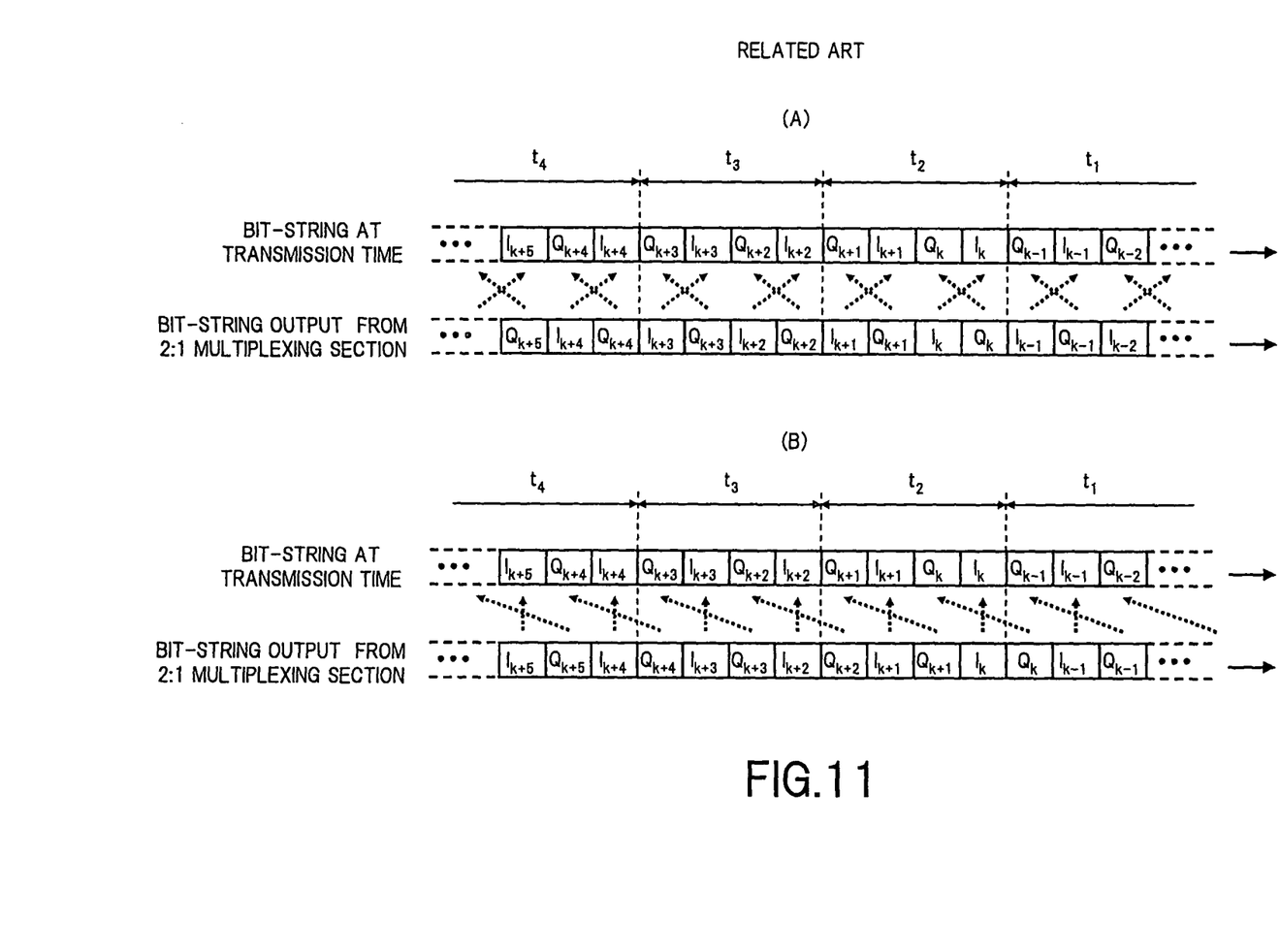
FIG. 11 is a diagram showing one example of a control for making shifted components I and Q to be correctly received in the conventional optical reception apparatus.

In the above table 1, the double circle mark indicates the correct reception state. The single circle mark indicates a state where the logic inversion needs to be controlled. The triangular mark indicates a state where the logic inversion and also the bit swap need to be controlled. The rhomboid-shaped mark indicates a state where the bit swap needs to be controlled. The cross mark indicates a state where the optimization of the delay interferometer needs to be performed. Incidentally, the control of the bit swap is a control for swapping respective former and latter bits corresponding to the components I and Q with each other, in the case where, as shown in FIG. 11(A) for example, bit strings of the data signal output from the 2:1 multiplexing section 235 are in a state as shown in the lower stage relative to bit strings thereof (herein, for the simplicity, 4 bit strings) at the transmission time on the upper stage. Further, in the case where, as shown in FIG. 11(B) for example, the one bit delay occurs in the state shown in the lower stage of FIG. 11(A), such a control for shifting the bit corresponding to the component Q while holding the bit corresponding to the component I is included in the control of the bit swap.

For the control of the logic inversion or the bit swap for the data signal output from the 2:1 multiplexing section 235, for example, it is considered that the dedicated designing is made corresponding to the DQPSK modulation format as the framer function of the received data processing section 236, so that the digital processing is executed in the framer. However, in such a dedicated framer, the ultra-high speed logical processing is required. Therefore, in order to realize such a dedicated framer, there are caused problems of an increase of power consumption, an increase of chip area and an increase of cost and the like. Such problems are not limited to the DQPSK modulation format and are common to the demodulating processing of the signal light which is differential phase shift keying modulated using the quadrature-phase component.

SUMMARY OF THE INVENTION

The present invention has been accomplished in view of the above problems and has an object to provide an optical reception apparatus of low cost and low power consumption, capable of demodulating a signal light which is differential phase shift keying modulated using a quadrature-phase component, utilizing a general-purpose framer.

In order to achieve the above object, one aspect of an optical reception apparatus according to the present invention, for receiving to process a signal light which is differential phase shift keying modulated using a quadrature-phase component, comprises: a branching section that branches the signal light input thereto into two; first and second delay interferometers respectively arranged on optical paths through which the respective lights branched in the branching section are propagated; first and second photoelectric converting sections that receive the respective lights output from the first and second delay interferometers to convert them into electric signals, and output respectively first and second data signals corresponding to the quadrature-phase component of the signal light; a clock recovery circuit for recovering a clock signal based on the data signal output from one of the first and second photoelectric converting sections; a multiplexing section that outputs a third data signal which is obtained by multiplexing the first and second data signals output from the first and second photoelectric converting sections, in accordance with timing of the clock signal recovered by the clock recovery circuit; a framer for framing the third data signal output from the multiplexing section in accordance with a predetermined communication method and also for generating a frame synchronizing signal indicating whether or not the frame synchronization is achieved; and a delay interferometer control section that, when the frame synchronization is not achieved, performs a control of resetting operating conditions of the first and second delay interferometers according to the frame synchronizing signal generated by the framer, and repetitively performs the control until the frame synchronization is achieved.

In the optical transmission apparatus of the above configuration, the input signal light is branched in the branching section into two, to be supplied to the first and second delay interferometers, and the lights which delay interfered with each other in the first and second delay interferometers are converted into the electric signals in the first and second photoelectric converting sections, so that the first and second data signals respectively corresponding to the quadrature-phase component of the received signal light are generated. The first and second data signals are sent to the multiplexing section, and also, one of the data signals is sent to the clock recovery circuit to be used for the recovery of the clock signal. In the multiplexing section, the third data signal is generated, which is obtained by multiplexing the first and second data signals, in accordance with the timing of the clock signal from the clock recovery circuit, and the generated third data signal is supplied to the framer to be framed in accordance with the predetermined communication method. At this time, it is detected whether or not the frame synchronization is achieved, and the frame synchronizing signal indicating the detection result is output to the delay interferometer control section. The delay interferometer control section performs the control of resetting the operating conditions of the first and second delay interferometers, in the case where the frame synchronizing signal indicates that the frame synchronization is not achieved. As a result, a relative phase relation between the first and second data signals and the clock signal, which are input to the multiplexing section, and bit-strings thereof, are changed compared with those before the reset control. Thus, the above reset control is repetitively performed until the frame synchronization is achieved, so that a correct reception state can be realized.

Further, another aspect of the optical reception apparatus according to the present invention, for receiving to process a signal light which is differential phase shift keying modulated using a quadrature-phase component, comprises: a branching section that branches the signal light input thereto into two; first and second delay interferometers respectively arranged on optical paths through which the respective lights branched in the branching section are propagated; first and second photoelectric converting sections that receive the respective lights output from the first and second delay interferometers to convert them into electric signals, and output respectively first and second data signals corresponding to the quadrature-phase component of the signal light; a clock recovery circuit for recovering a clock signal based on the data signal output from one of the first and second photoelectric converting sections; a multiplexing section that outputs a third data signal which is obtained by multiplexing the first and second data signals output from the first and second photoelectric converting sections, in accordance with timing of the clock signal recovered by the clock recovery circuit; a framer for framing the third data signal output from the multiplexing section in accordance with a predetermined communication method and also for generating a frame synchronizing signal indicating whether or not the frame synchronization is achieved; and a clock recovery control section that, when the frame synchronization is not achieved, performs a control of resetting timing of the clock recovery processing in the clock recovery circuit according to the frame synchronizing signal generated by the framer, and repetitively performs the control until the frame synchronization is achieved.

In the optical reception apparatus of the above configuration, similarly to the above described one aspect, the first and second data signals output from the first and second photoelectric converting sections are multiplexed in the multiplexing section in accordance with the timing of the clock signal recovered by the clock recovery circuit, and the third data signal output from the multiplexing section is framed by the framer, and also, the frame synchronizing signal is output from the framer to the clock recovery control section. The clock recovery control section performs the control of resetting the timing of the clock recovery processing in the clock recovery circuit, in the case where the frame synchronizing signal indicates that the frame synchronization is not achieved. As a result, phase relations of the clock signal to the first and second data signals input to the multiplexing section are changed compared with those before the reset control. Thus, the above reset control is repetitively performed until the frame synchronization is achieved, so that a correct reception state can be realized.

According to the optical reception apparatus of the present invention as described in the above, without the necessity of designing a dedicated framer which is required to perform the high-speed digital processing so as to cope with the inversion or the shifting of components I and Q occurred when the signal light which is differential phase shift keying modulated using the quadrature-phase component is demodulated, the correct reception state of the components I and Q can be realized using a general-purpose framer, and thereby, it becomes possible to provide the optical reception apparatus of low cost and low power consumption.

Other objects, features and advantages of the present invention will become apparent from the following explanation of the embodiments, in conjunction with the appended drawings.

DESCRIPTION OF THE PREFERRED EMBODIMENTS

There will be described embodiments for implementing the present invention, with reference to the accompanying drawings. The same reference numerals denote the same or equivalent parts in all drawings.

Figure 1:
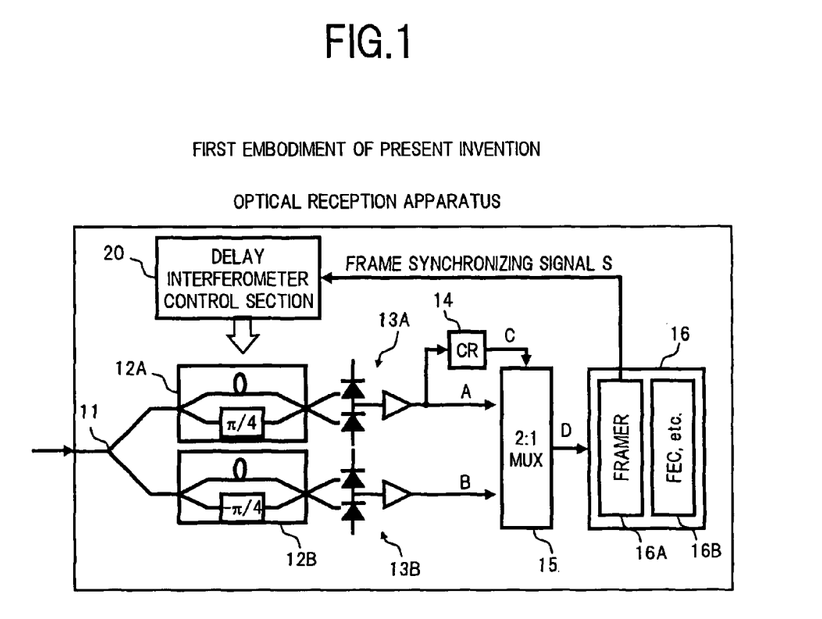
FIG. 1 is a block diagram showing a configuration of a first embodiment of an optical reception apparatus according to the present invention.

FIG. 1 is a block diagram showing a configuration of a first embodiment of an optical reception apparatus according to the present invention.

In FIG. 1, the optical transmission apparatus in the first embodiment is for receiving to process, for example, a signal light in a differential quadrature phase-shift keying modulation (DQPSK) format which is one of differential phase shift keying modulation formats using a quadrature-phase component, and comprises: a branching section 11 that branches the signal light input thereto into two; delay interferometers 12A and 12B respectively arranged on optical paths through which the branched lights are propagated; photoelectric converting sections 13A and 13B that receive respectively the lights output from the delay interferometers 12A and 12B; a clock recovery (CR) circuit 14 for recovering a clock signal C based on a data signal A output from the photoelectric converting section 13A; a 2:1 multiplexing section (MUX) 15 that multiplexes the data signal A and a data signal B from the photoelectric converting sections 13A and 13B in accordance with timing of the clock signal C; a received data processing section 16 that receives to process a data signal D output from the 2:1 multiplexing section 15; and a delay interferometer control section 20 that performs a control of resetting operating conditions of the delay interferometers 12A and 12B according to a frame synchronizing signal S output from the received data processing section 16.

The branching section 11, similarly to that in a conventional configuration shown in FIG. 9, receives the signal light in DQPSK modulation format, which has been transmitted from an optical transmission apparatus through a transmission path and an optical repeater, and branches this signal light into two to output the branched lights to the delay interferometers 12A and 12B.

Incidentally, herein there will be described one example in which the signal light in the DQPSK modulation format is input. However, the signal light to be input to the optical reception apparatus of the present invention is not limited to the above, and it is possible to use an arbitrary signal light which is differential phase shift keying modulated using the quadrature-phase component. Further, the signal light to be input to the optical reception apparatus of the present invention may be a signal light obtained by (CS)RZ pulsing a differential phase shift keying modulated signal light.

The delay interferometer 12A makes a delay component per 1 bit time and a component phase controlled of π/4rad to interfere (delay interfere) with each other, to output interference results thereof as two outputs. Further, the delay interferometer 12B makes a delay component per 1 bit time and a component phase controlled of −π/4rad (which is shifted by π/2rad to the phase controlled component in the delay interferometer 12A) to interfere (delay interfere) with each other, to output interference results thereof as two outputs. Here, the delay interferometers 12A and 12B each is configured by a Mach-Zehnder interferometer, and each Mach-Zehnder interferometer is configured so that one of branched waveguides is formed to be longer than the other branched waveguide by the propagation length equivalent to the 1 bit time, and also, is formed with an electrode for phase controlling the optical signal propagated through the other branched waveguide.

The photoelectric converting sections 13A and 13B are respectively configured by dual pin photodiodes for receiving the respective output lights from the delay interferometers 12A and 12B to perform the differential photoelectric conversion detections. Incidentally, signals detected respectively by the photoelectric converting sections 13A and 13B are appropriately amplified by amplifiers.

The clock recovery circuit 14 is a typical electric circuit for recovering the clock signal C from the received signal which is subjected to the differential photoelectric conversion detection in the photoelectric converting section 13A, and the clock signal C recovered by the clock recovery circuit 14 is output t to the 2:1 multiplexing section 15.

The 2:1 multiplexing section 15 multiplexes the data signal A output from the photoelectric converting section 13A and the data signal B output from the photoelectric converting section 13B in accordance with the timing of the clock signal C from the clock recovery circuit 14, to convert the multiplexed data signal into the data signal D equivalent to the signal light before the DQPSK modulation in the transmission side.

The received data processing section 16 comprises a general-purpose framer 16A for framing the data signal D output from the 2:1 multiplexing section 15 and a signal processing circuit (FEC, etc.) 16B provided with a function as a decoder for decoding an error-correcting code given in the transmission side. The framer 16A frames the data signal D in accordance with a predetermined communication method, for example, SONET/SDH or the like, to output it to the signal processing circuit 16B, and also, generates the frame synchronizing signal S indicating whether or not the frame synchronization is achieved to output it to the delay interferometer control section 20. As a specific example of such a general-purpose framer 16A, there can be cited a conventional NRZ framer and the like.

The delay interferometer control section 20 outputs a control signal for temporarily stopping operations of the delay interferometers 12A and 12B to reset the operating conditions thereof according to the frame synchronizing signal S from the framer 16A, in the case where the frame synchronization is not achieved. Incidentally, means for resetting the operating conditions of the delay interferometers 12A and 12B will be specifically described in embodiments to be described later.

In the optical reception apparatus of the above configuration, the input DQPSK signal light is branched in the branching section 11 into two, and the branched lights are supplied respectively to the delay interferometers 12A and 12B. In each of the delay interferometers 12A and 12B, the lights from the branching section 11 are supplied to the Mach-Zehnder optical waveguide in each of which the optical path lengths of two arms are different from each other, so that a relative delay time difference corresponding to the 1 bit time of the DQPSK modulated code is given between the lights propagated through the respective arms of each of the delay interferometers 12A and 12B. Further, a phase difference of π/4rad is given between the lights propagated through the arms of the delay interferometer 12A, and a phase difference of −π/4rad is given between the lights propagated through the respective arms of the delay interferometer 12B. As a result, in each of the delay interferometers 12A and 12B, complementary two outputs which delay interfere with each other are obtained, and the output lights of the delay interferometers 12A and 12B are sent respectively to the photoelectric converting sections 13A and 13B.

In each of the photoelectric converting sections 13A and 13B, the complementary two outputs from each of the delay interferometers 12A and 12B are photo-electrically converted by the dual pin photodiode, so that the electric signal obtained by demodulating the quadrature-phase component of the received signal light, is generated. Then, an output signal of the photoelectric converting section 13A is amplified appropriately up to a required level by the amplifier, and thereafter, is output as the data signal A to the clock recovery circuit 14 and the 2:1 multiplexing section 15. Further, an output signal of the photoelectric converting section 13B is amplified appropriately up to a required level by the amplifier, and thereafter, is output as the data signal B to the 2:1 multiplexing section 15. In the clock recovery circuit 14, the clock signal C having a frequency corresponding to a bit rate of the data signal A is recovered based on the data signal A from the photoelectric converting section 13A, to be supplied to the 2:1 multiplexing section 15. In the 2:1 multiplexing section 15, the data signal D which is obtained by multiplexing the data signals A and B from the photoelectric converting sections 13A and 13B is generated to be output to the received data processing section 16.

In the received data processing section 16, the data signal D output from the 2:1 multiplexing section 15 is supplied to the framer 16A. In the framer 16A, the data signal D is framed in accordance with the predetermined communication method to be output to the signal processing circuit 16B, and also, the frame synchronizing signal S indicating whether or not the frame synchronization is achieved is generated to be output to the delay interferometer control section 20. The delay interferometer control section 20 performs the reset control for temporarily stopping the operations of the delay interferometers 12A and 12B, in the case where the frame synchronizing signal S from the framer 16A indicates that the frame synchronization is not achieved. As a result of this reset control, a relative phase relation between the data signals A and B and the clock signal C, which are input to the 2:1 multiplexing section 15, and bit-strings thereof, are changed compared with those before the reset control. Namely, the logic inversion or the shifting (inclusive of bit delay) of components I and Q supplied to the 2:1 multiplexing section 15 occurs in probability. Therefore, by repetitively performing the reset control on the delay interferometers 12A and 12B until the frame synchronization is achieved, it becomes possible to realize a correct reception state shown in the double circle mark in the above described table 1.

Then, when the data signal D frame synchronized is output from the framer 16A, the required signal processing, such as the decoding of the error-correcting code or the like, is performed on the data signal D by the signal processing circuit 16B.

According to the optical reception apparatus of the first embodiment as described in the above, without the necessity of designing a dedicated framer which is required to perform the high-speed digital processing so as to cope with the inversion or the shifting of the components I and Q occurred when the signal light in the DQPSK modulation format is demodulated, the correct reception state of the components I and Q can be realized using the general-purpose framer 16A. Thus, it becomes possible to provide the optical reception apparatus of low cost and low power consumption. By applying such an optical reception apparatus, an ultra-high speed optical transmission system can be realized at a low cost, and also it becomes possible to realize a high-speed optical network in early stage by achieving the general-purpose of the optical reception apparatus.

Next, there will be described specific embodiments related to the optical reception apparatus of the first embodiment.

Figure 2:
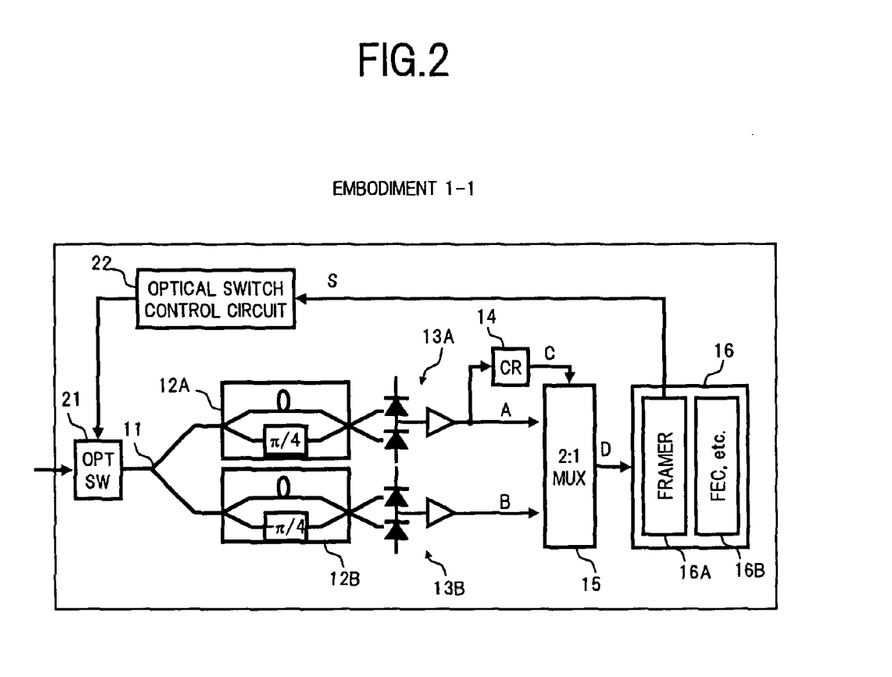
FIG. 2 is a block diagram showing a configuration of an embodiment 1-1 of the optical reception apparatus according to the present invention.

FIG. 2 is a block diagram showing a configuration of an embodiment 1-1 of the optical reception apparatus according to the present invention.

In FIG. 2, in the present optical reception apparatus, as a specific configuration example of the delay interferometer control section 20 in the first embodiment, an optical switch (OPTSW) 21 is arranged on the former stage of the branching section 11, and an optical switch control circuit 22 for switching the ON/OFF of the optical switch 21 according to the frame synchronizing signal S is disposed.

In the optical reception apparatus of such a configuration, when the state where the frame synchronization is not achieved is transmitted to the optical switch control circuit 22 by the frame synchronizing signal S output from the framer 16A, the optical switch control circuit 22 switches the optical switch 21 in an ON state to be in an OFF state, and after a predetermined period of time has elapsed, again switches the optical switch 21 to be in the ON state. By the ON/OFF switching of the optical switch 21, the input of the signal light to each of the delay interferometers 12A and 12B is temporarily blocked. Each of the delay interferometers 12A and 12B starts to operate when the signal light is input thereto, and therefore, the operating condition thereof is reset by the blocking of the signal light input.

Incidentally, for each of the delay interferometers 12A and 12B, the operating condition thereof is optimized by performing a feedback control of a delay amount and the like using the output signal thereof, and therefore, when the input of the signal light is blocked, it is preferable to reset the feedback control or to hold the control state before the blocking of the input of the signal light.

By the ON/OFF switching of the optical switch 22 as described in the above, the relative phase relation between the data signals A and B and the clock signal C, which are input to the 2:1 multiplexing section 15, and the bit-strings thereof, are changed compared with those before the ON/OFF switching of the optical switch 22, and therefore, the logic inversion or the shifting of the components I and Q occurs in probability. Thus, it becomes possible to realize the correct reception state by repetitively performing the ON/OFF switching of the optical switch 21 until the frame synchronization is achieved.

Figure 3:
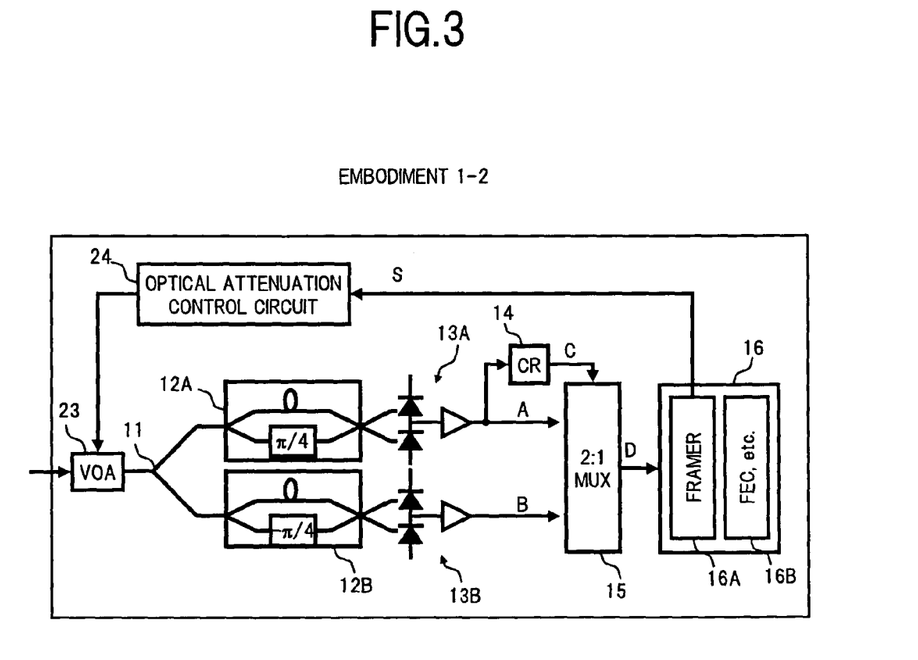
FIG. 3 is a block diagram showing a configuration of an embodiment 1-2 of the optical reception apparatus according to the present invention.

FIG. 3 is a block diagram showing a configuration of an embodiment 1-2 of the optical reception apparatus according to the present invention.

In FIG. 3, in the present optical reception apparatus, as another specific configuration example of the delay interferometer control section 20 in the first embodiment, a variable optical attenuator (VOA) 23 is arranged on the former stage of the branching section 11, and an optical attenuation control circuit 24 for controlling the optical attenuation in the variable optical attenuator 23 according to the frame synchronizing signal S is disposed.

In the optical reception apparatus of such a configuration, when the state where the frame synchronization is not achieved is transmitted to the optical attenuation control circuit 24 by the frame synchronizing signal S output from the framer 16A, the optical attenuation control circuit 24 controls the variable optical attenuator 23 of which optical attenuation is in a minimum state so that the optical attenuation thereof becomes in a maximum state, and after a predetermined period of time has elapsed, brings the optical attenuation back to the original minimum state. By the control of the variable optical attenuator 23, similarly to the case of the above described ON/OFF switching of the optical switch 21, the input of the signal light to each of the delay interferometers 12A and 12B is temporarily blocked and the operating conditions thereof are reset. As a result, the relative phase relation between the data signals A and B and the clock signal C, which are input to the 2:1 multiplexing section 15, and the bit-strings thereof, are changed compared with those before the control of the variable optical attenuator 23, and therefore, the logic inversion or the shifting of the components I and Q occurs in probability. Thus, it becomes possible to realize the correct reception state by repetitively performing the above described control of the variable optical attenuator 23 until the frame synchronization is achieved.

Figure 4:
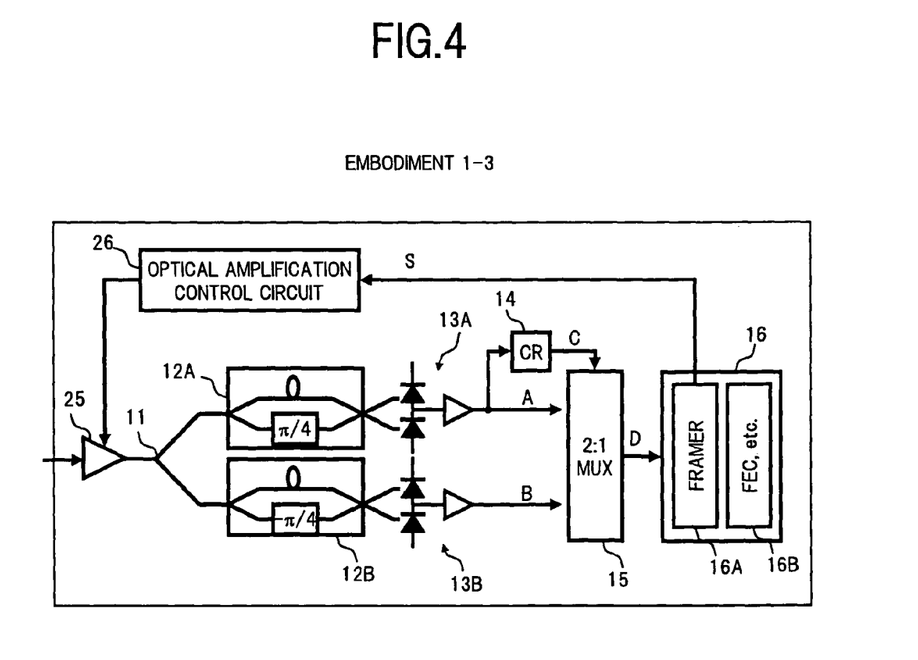
FIG. 4 is a block diagram showing a configuration of an embodiment 1-3 of the optical reception apparatus according to the present invention.

FIG. 4 is a block diagram showing a configuration of an embodiment 1-3 of the optical reception apparatus according to the present invention.

In FIG. 4, in the present optical reception apparatus, as a further specific configuration example of the delay interferometer control section 20 in the first embodiment, an optical amplifier 25 is arranged on the former stage of the branching section 11, and an optical amplification control circuit 26 for controlling the optical amplification in the optical amplifier 25 according to the frame synchronizing signal S is disposed.

In the optical reception apparatus of such a configuration, when the state where the frame synchronization is not achieved is transmitted to the optical amplification control circuit 26 by the frame synchronizing signal S output from the framer 16A, the optical amplification control circuit 26 stops an operation of the optical amplifier 25 which is in a driven state at a previously set amplification factor, and after a predetermined period of time has elapsed, returns the optical amplifier 25 to be in the driven state before the operation stop. By the control of the driven state of the optical amplifier 25, the input of the signal light to each of the delay interferometers 12A and 12B is temporarily blocked. Incidentally, the optical amplifier 25 in the operation stop state generally functions as a loss medium to the input light, and therefore, an output from the optical amplifier 25 is not completely blocked so that the signal light at an ultra-weak level may be input to each of the delay interferometers 12A and 12B. Even in such a case, if a level of the signal light input to each of the delay interferometers 12A and 12B is lower than a lower limit value of an input level at which each of the delay interferometers 12A and 12B is effectively operated, the operating conditions of the delay interferometers 12A and 12B are reset. As a result, similarly to the case of the above described ON/OFF switching of the optical switch 21, the relative phase relation between the data signals A and B and the clock signal C, which are input to the 2:1 multiplexing section 15, and the bit-strings thereof, are changed compared with those before the control of the optical amplifier 25, and therefore, the logic inversion or the shifting of the components I and Q occurs in probability. Thus, it becomes possible to realize the correct reception state by repetitively performing the above described control of the optical amplifier 25 until the frame synchronization is achieved.

Next, there will be described a second embodiment of the optical reception apparatus according to the present invention.

Figure 5:
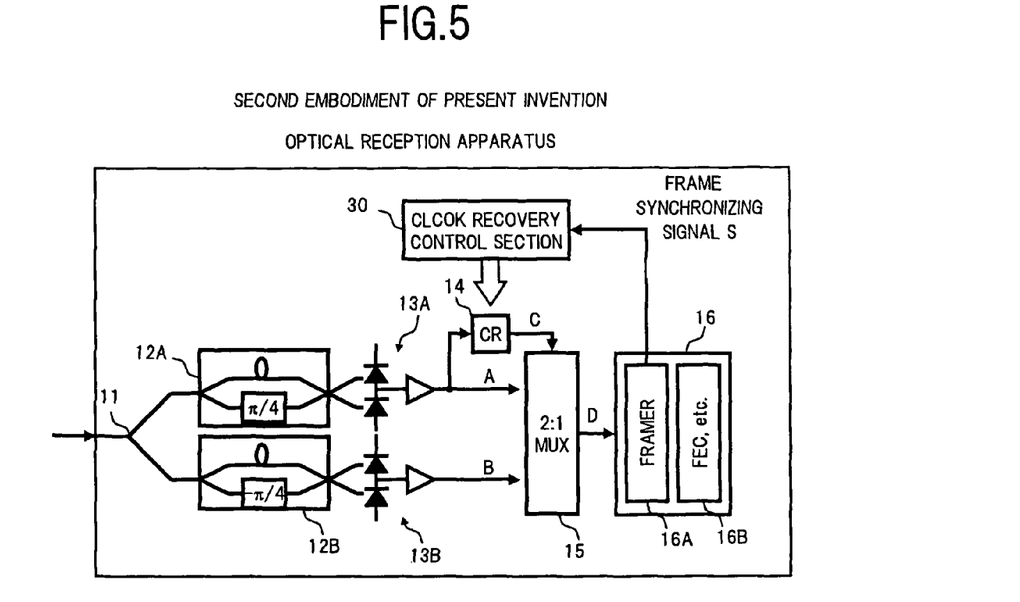
FIG. 5 is a block diagram showing a configuration of a second embodiment of the optical reception apparatus according to the present invention.

FIG. 5 is a block diagram showing a configuration of the second embodiment of the optical reception apparatus according to the present invention.

In FIG. 5, the configuration of the second embodiment differs from that of the first embodiment shown in FIG. 1 in that, in place of the delay interferometer control section 20, a clock recovery control section 30 is disposed, and the configuration other than this is same as that of the first embodiment.

The clock recovery control section 30 receives the frame synchronizing signal S from the framer 16A, and when the state where the frame synchronization is not achieved is transmitted by the frame synchronizing signal S, outputs a control signal for resetting timing of the clock recovery processing in the clock recovery circuit 14. Incidentally, means for resetting the timing of the clock recovery processing will be specifically described in embodiments to be described later.

In the optical reception apparatus of the above configuration, similarly to the above first embodiment, the signal lights which are obtained by branching the signal light by the branching section 11 into two, are supplied to the delay interferometers 12A and 12B, and the complementary two outputs which delay interfered with each other are photo-electrically converted in the photoelectric converting sections 13A and 13B, so that the data signals A and B are generated, which are obtained by demodulating the quadrature phase components of the received signal lights. The data signal A is output to the clock recovery circuit 14 and the 2:1 multiplexing section 15, while the data signal B being output to the 2:1 multiplexing section 15. In the clock recovery circuit 14, the clock signal C is recovered based on the data signal A from the photoelectric converting section 13A to be supplied to the 2:1 multiplexing section 15. In the 2:1 multiplexing section 15, the data signal D which is obtained by multiplexing the data signals A and B from the photoelectric converting sections 13A and 13B in accordance with the timing of the clock signal C is generated, to be output to the received data processing section 16. In the received data processing section 16, the data signal D output from the 2:1 multiplexing section 15 is supplied to the framer 16A, and is framed in accordance with the predetermined communication method to be output to the signal processing circuit 16B, and also, the framed synchronizing signal S indicating whether or not the frame synchronization is achieved is generated to be output to the clock recovery control section 30.

The clock recovery control section 30 performs a control of resetting the timing of the clock recovery processing in the clock recovery circuit 14, in the case where the frame synchronizing signal S from the frame 16A indicates that the frame synchronization is not achieved. By this reset control, a phase relation of the clock signal C to the data signals A and B, which are input to the 2:1 multiplexing section 15, is changed compared with that before the reset control. Namely, the shifting (inclusive of the bit delay) of the components I and Q to be supplied to the 2:1 multiplexing section 15 occurs in probability. Thus, for the case where the inversion of the components I and Q does not occur (corresponding to the rhomboid-shaped mark in the table 1), it becomes possible to realize the correct reception state (corresponding to the double circle mark in the table 1) by repetitively performing the above described reset control of the timing of the clock recovery processing until the frame synchronization is achieved.

Then, when the data signal D in which the frame synchronization is achieved is output from the framer 16A, the required signal processing such as the decoding of the error-correcting code or the like is performed on the data signal D by the signal processing circuit 16B.

According to the optical reception apparatus of the second embodiment as described in the above, without the necessity of designing the DQPSK dedicated framer which is required to perform the high-speed digital processing so as to cope with the shifting (inclusive of the bit delay) of the components I and Q occurred when the signal light in the DQPSK modulation format is demodulated, the correct reception state of the components I and Q can be realized using the general-purpose framer 16A. Thus, it becomes possible to provide the optical reception apparatus of low cost and low power consumption. By applying such an optical reception apparatus, an ultra-high speed optical transmission system can be realized at a low cost, and also it becomes possible to realize a high-speed optical network in early stage by achieving the general-purpose of the optical reception apparatus.

Incidentally, in the second embodiment, there has been described the configuration example in which only the reset control of the timing of the clock recovery processing is performed. However, it is also possible to consider a combination of the reset control of the timing of the clock recovery processing with the reset control of the delay interferometers in the first embodiment. In such a case, it becomes possible to cope with the inversion of the components I and Q in addition to the shifting (inclusive of the bit delay) of the components I and Q.

Next, there will be described specific embodiments related to the optical reception apparatus in the second embodiment.

Figure 6:
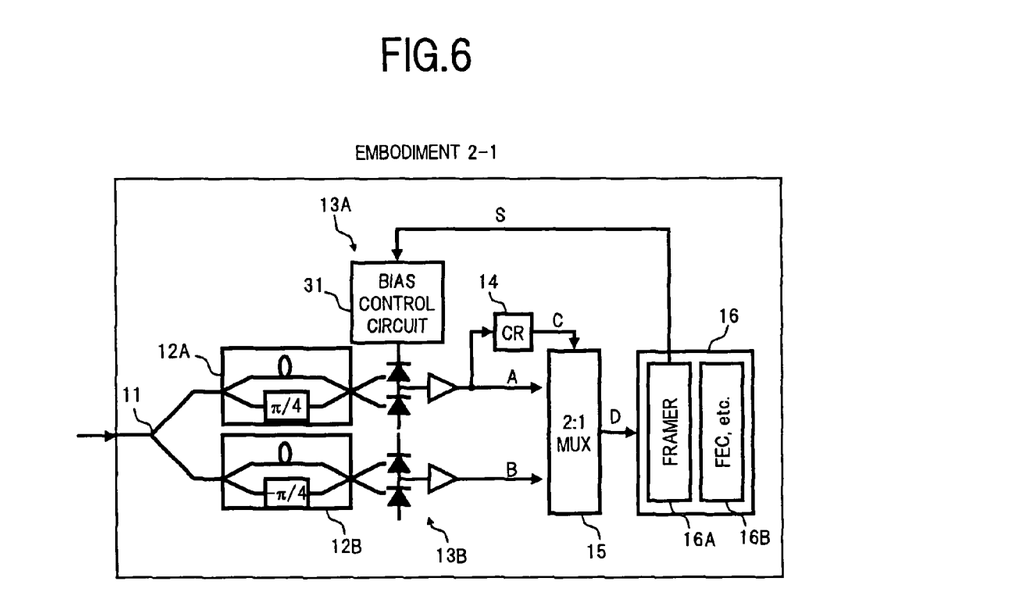
FIG. 6 is a block diagram showing a configuration of an embodiment 2-1 of the optical reception apparatus according to the present invention.

FIG. 6 is a block diagram showing a configuration of an embodiment 2-1 of the optical reception apparatus according to the present invention.

In FIG. 6, in the present optical reception apparatus, as a specific configuration example of the clock recovery control section 30 in the second embodiment, there is disposed a bias control circuit 31 for controlling a bias voltage applied on a light receiving element (dual pin photodiode) of the photoelectric converting section 13A according to the frame synchronizing signal S. Incidentally, although there is shown one example in which the bias voltage is applied on a cathode of the light receiving element, the configuration may be such that the bias voltage is applied on an anode. Further, the light receiving element is not limited to the pin photodiode, and may be an avalanche photodiode (APD) or the like.

In the optical reception apparatus of such a configuration, when the state where the frame synchronization is not achieved is transmitted to the bias control circuit 31 by the frame synchronizing signal S output from the framer 16A, the bias control circuit 31 controls the bias voltage applied on the light receiving element to stop an operation of the photoelectric converting section 13A, and after a predetermined period of time has elapsed, brings the bias voltage back to an original state to resume the operation of the photoelectric converting section 13A. By the control of the bias voltage, the output of the data signal A from the photoelectric converting section 13A is suspended so that the input of the data signal A to the clock recovery circuit 14 is temporarily blocked, and therefore, the timing of the clock recovery processing in the clock recovery circuit 14 is reset. Incidentally, during a period of time when the output of the data signal A from the photoelectric converting section 13A is suspended by the control of the bias voltage, the operating conditions of the delay interferometers 12A and 12B are not changed, and therefore, the relative phase relation between the output lights from the delay interferometers 12A and 12B is maintained. As a result, the phase relation of the clock signal C to the data signals A and B, which are input to the 2:1 multiplexing section 15, is changed compared with that before the control of the bias voltage, and therefore, the shifting of the components I and Q occurs in probability. Thus, it becomes possible to realize the correct reception state by repetitively performing the above described control of the bias voltage until the frame synchronization is achieved.

Incidentally, in the embodiment 2-1, there has been shown the configuration in which the bias voltage applied on the light receiving element is controlled to thereby stop the operation of the photoelectric converting section 13A. However, in addition to this, the configuration may be such that the operation of the photoelectric converting section 13A is stopped by controlling for example a drive voltage of the amplifier disposed on the latter stage of the light receiving element.

Figure 7:
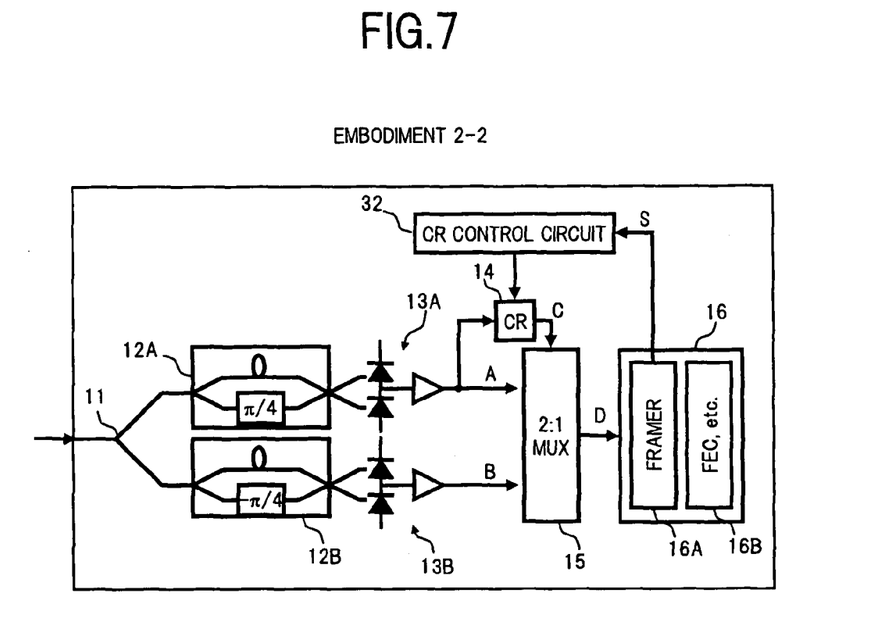
FIG. 7 is a diagram showing a configuration of an embodiment 2-2 of the optical reception apparatus according to the present invention.

FIG. 7 is a block diagram showing a configuration of an embodiment 2-2 of the optical reception apparatus according to the present invention.

In FIG. 7, in the present optical reception apparatus, as another specific configuration example of the clock recovery control section 30 in the second embodiment, in the case where the clock recovery circuit 14 is provided with a configuration capable of being relocked-in by an external control signal, there is disposed a clock recovery control circuit 32 for generating the external control signal according to the frame synchronizing signal S.

In the optical reception apparatus of such a configuration, when the state where the frame synchronization is not achieved is transmitted to the clock recovery control circuit 32 by the frame synchronizing signal S output from the framer 16A, the clock recovery control circuit 32 outputs the control signal for instructing the relocking-in to the clock recovery circuit 14, so that the timing of the clock recovery processing in the clock recovery circuit 14 is reset. As a result, the phase relation of the clock signal C to the data signals A and B, which are input to the 2:1 multiplexing section 15, is changed compared with that before the relocking-in control of the clock recovery circuit 14, and therefore, the shifting of the components I and Q occurs in probability. Thus, it becomes possible to realize the correct reception state by repetitively performing the above described relocking-in control of the clock recovery circuit 14 until the frame synchronization is achieved.

Figure 8:
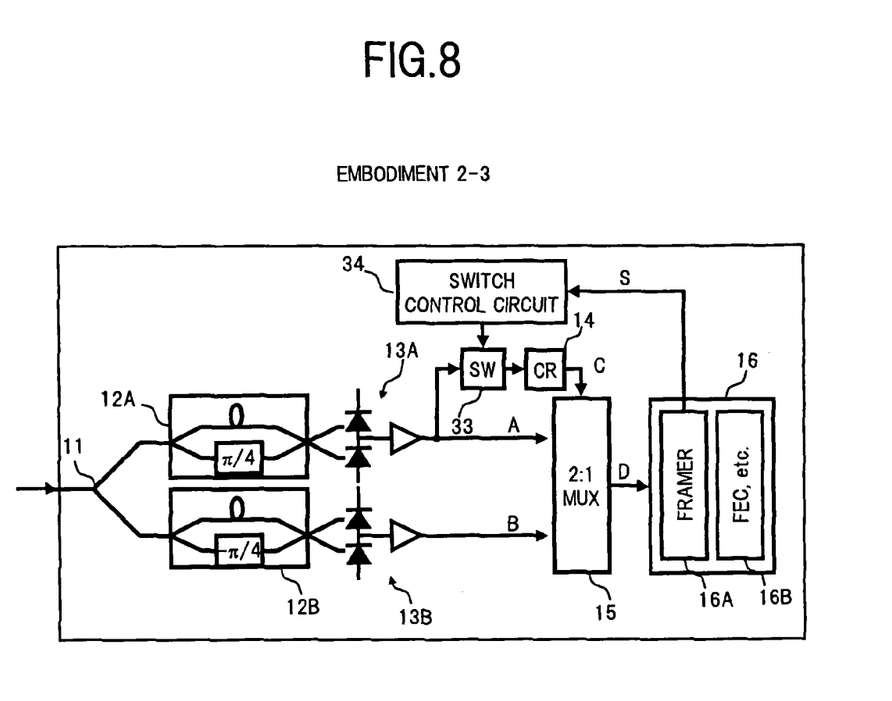
FIG. 8 is a diagram showing a configuration of an embodiment 2-3 of the optical reception apparatus according to the present invention.

FIG. 8 is a block diagram showing a configuration of an embodiment 2-3 of the optical reception apparatus according to the present invention.

In FIG. 8, in the present optical reception apparatus, as a further specific configuration example of the clock recovery control section 30 in the second embodiment, a switch (SW) 33 is inserted onto an electric line between the photoelectric converting section 13A and the clock recovery circuit 14, and a switch control circuit 34 for controlling the ON/OFF switching of the switch 33 according to the frame synchronizing signal S is disposed.

In the optical reception apparatus of such a configuration, when the state where the frame synchronization is not achieved is transmitted to the switch control circuit 34 by the frame synchronizing signal S output from the framer 16A, the switch control circuit 34 switches the switch 34 in an ON state to be in an OFF state, and after a predetermined period of time has elapsed, again switches the switch 34 to be in the ON state. By the ON/OFF switching of the switch 33, since the input of the data signal A to the clock recovery circuit 14 is temporarily blocked, the timing of the clock recovery processing in the clock recovery circuit 14 is reset. As a result, the phase relation of the clock signal C to the data signals A and B, which are input to the 2:1 multiplexing section 15, is changed compared with that before the ON/OFF switching of the switch 33, and therefore, the shifting of the components I and Q occurs in probability. Thus, it becomes possible to realize the correct reception state by repetitively performing the above described ON/OFF switching of the switch 33 until the frame synchronization is achieved.

What is claimed is:

1. An optical reception apparatus for receiving to process a signal light which is differential phase shift keying modulated using a quadrature-phase component, comprising:

a splitter that splits said signal light input thereto into two lights;

first and second delay interferometers respectively arranged on optical paths through which the respective lights split in said splitter are propagated;

first and second photoelectric converters that receive the respective lights output from said first and second delay interferometers to convert the two lights into electric signals, and output respectively first and second data signals corresponding to the quadrature-phase component of said signal light;

a clock recovery circuit configured to recover a clock signal based on the data signal output from one of said first and second photoelectric converters;

a multiplexer that outputs a third data signal which is obtained by multiplexing the first and second data signals output from said first and second photoelectric converters, in accordance with timing of the clock signal recovered by said clock recovery circuit;

a framer configured to frame the third data signal output from said multiplexer in accordance with a predetermined communication method and also to generate a frame synchronizing signal indicating whether or not a frame synchronization is achieved; and a delay interferometer controller that, when the frame synchronization is not achieved, performs a control of resetting operating conditions of said first and second delay interferometers according to the frame synchronizing signal generated by said framer, and repetitively performs said control until the frame synchronization is achieved, wherein the resetting control of said delay interferometer controller is performed by temporarily blocking input of said signal light to each of said first and second delay interferometers to suspend the operations thereof.

2. An optical reception apparatus according to claim 1, wherein said delay interferometer controller comprises:

an optical switch arranged on a former stage of said splitter; and an optical switch control circuit configured to perform ON/OFF switching of said optical switch according to said frame synchronizing signal, and said delay interferometer controller, when the frame synchronization is not achieved, temporarily block the input of the signal light to each of said first and second delay interferometers by said optical switch control circuit to reset the operating conditions thereof.

3. An optical reception apparatus according to claim 1, wherein said delay interferometer controller comprises:

a variable optical attenuator arranged on a former stage of said splitter; and an optical attenuation control circuit configured to control an optical attenuation of said variable optical attenuator according to said frame synchronizing signal, and said delay interferometer controller, when the frame synchronization is not achieved, temporarily blocks the input of said signal light to each of said first and second delay interferometers by said optical attenuation control circuit to reset the operating conditions thereof.

4. An optical reception apparatus according to claim 1, wherein said delay interferometer controller comprises:
an optical amplifier arranged on a former stage of said splitter; and
an optical amplification control circuit configured to control an optical amplification in said optical amplifier according to said frame synchronizing signal, and
said delay interferometer controller, when the frame synchronization is not achieved, temporarily makes an input level of said signal light to each of said first and second delay interferometers to be lower than a lower limit value by said optical amplification control circuit to reset the operating conditions thereof.

5. An optical reception apparatus according to claim 1, wherein said signal light is a signal light corresponding to a differential quadrature phase-shift keying (DQPSK) modulation format.

6. An optical reception apparatus for receiving to process a signal light which is differential phase shift keying modulated using a quadrature-phase component, comprising:
a splitter that splits said signal light input thereto into two lights;
first and second delay interferometers respectively arranged on optical paths through which the respective lights split in said splitter are propagated;
first and second photoelectric converters that receive the respective lights output from said first and second delay interferometers to convert the respective lights into electric signals, and output respectively first and second data signals corresponding to the quadrature-phase component of said signal light;
a clock recovery circuit configured to recover a clock signal based on the data signal output from one of said first and second photoelectric converters;
a multiplexer that outputs a third data signal which is obtained by multiplexing the first and second data signals output from said first and second photoelectric converters, in accordance with timing of the clock signal recovered by said clock recovery circuit;
a framer configured to frame the third data signal output from said multiplexer in accordance with a predetermined communication method and also to generate a frame synchronizing signal indicating whether or not a frame synchronization is achieved; and
a clock recovery controller that, when the frame synchronization is not achieved, performs a control of resetting timing of the clock recovery processing in said clock recovery circuit according to the frame synchronizing signal generated by said framer, and repetitively performs said control until the frame synchronization is achieved,
wherein the resetting control of said clock recovery controller is performed by temporarily blocking input of the first or second data signal to said clock recovery circuit.

7. An optical reception apparatus according to claim 6, wherein said first and second photoelectric converters respectively include light receiving elements which receive the lights output from said first and second delay interferometers to convert them into the electric signals; and
said clock recovery controller controls a bias voltage applied on said light receiving element of said one photoelectric converter that sends the data signal to said clock recovery circuit, according to said frame synchronizing signal, and when the frame synchronization is not achieved, temporarily blocks the output of the data signal from said one photoelectric converter to reset the timing of the clock recovery processing in said clock recovery circuit.

8. An optical reception apparatus according to claim 6, wherein said first and second photoelectric converters respectively include light receiving elements which receive the lights output from said first and second photoelectric converters and amplifiers which amplify output signals from said light receiving elements; and
said clock recovery controller controls a driven state of said amplifier of said one photoelectric converter that sends the data signal to said clock recovery circuit, according to said frame synchronizing signal, and when the frame synchronization is not achieved, temporarily suspends the output of the data signal from said one photoelectric converter to reset the timing of the clock recovery processing in said clock recovery circuit.

9. An optical reception apparatus according to claim 6, wherein said clock recovery controller comprises:
a switch arranged on a former stage of said clock recovery circuit; and
a switch control circuit that performs ON/OFF switching of said switch according to said frame synchronizing signal, and
said clock recovery controller, when the frame synchronization is not achieved, temporarily blocks the input of the data signal to said clock recovery circuit by said switch control circuit to reset the timing of the clock recovery processing in said clock recovery circuit.

10. An optical reception apparatus according to claim 6, wherein said signal light is a signal light corresponding to a differential quadrature phase-shift keying (DQPSK) modulation format.

* * * * *

UNITED STATES PATENT AND TRADEMARK OFFICE
CERTIFICATE OF CORRECTION

PATENT NO. : 7,805,085 B2  Page 1 of 1
APPLICATION NO. : 11/819737
DATED : September 28, 2010
INVENTOR(S) : Kiyotoshi Noheji It is certified that error appears in the above-identified patent and that said Letters Patent is hereby corrected as shown below:

Column 16, Line 60 in Claim 2, delete "block" and insert --blocks--, therefor.

Signed and Sealed this

Thirtieth Day of November, 2010

David J. Kappos
*Director of the United States Patent and Trademark Office*